Dec. 15, 1936.   J. G. RIEFF   2,064,448
GARDEN TOOL
Filed Jan. 9, 1936
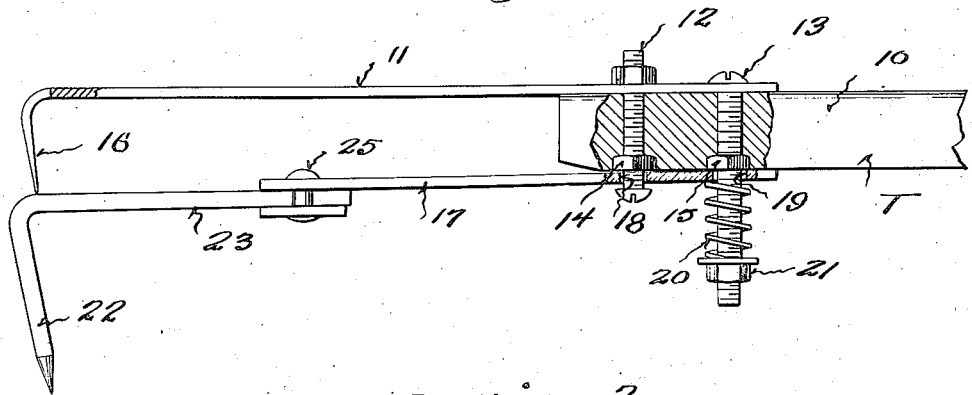
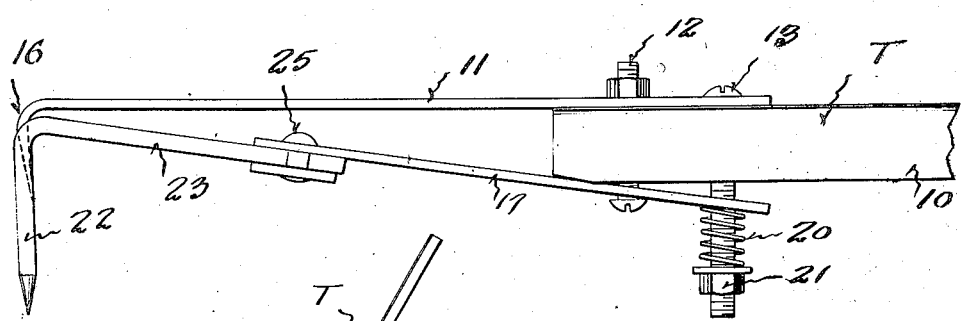
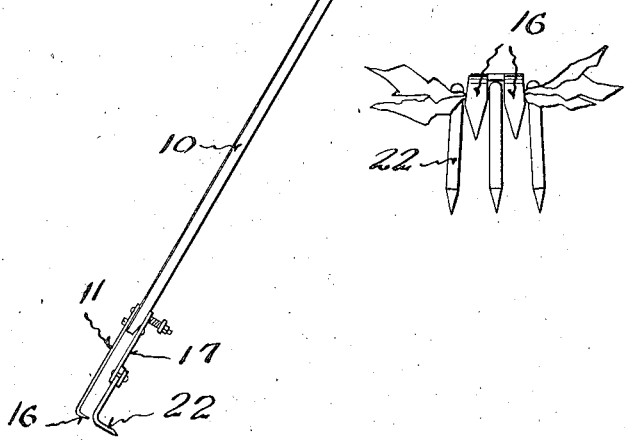
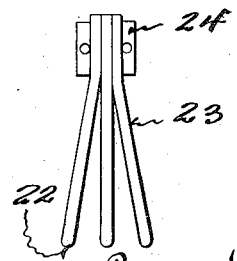
Inventor
J. G. Rieff
By Attorneys Patented Dec. 15, 1936

2,064,448

UNITED STATES PATENT OFFICE 2,064,448

GARDEN TOOL

John G. Rieff, London, Wis.

Application January 9, 1936, Serial No. 58,284

2 Claims. (Cl. 55—65)

This invention appertains to garden tools, and more particularly to a hand earth-working implement.

One of the primary objects of my present invention is to provide a novel tool for working the soil around plants, having means incorporated therewith for gripping and removing weeds from the ground without undue effort on the part of the user of the tool.

Another salient object of my invention is to provide a hand garden tool embodying an elongated handle having prongs on one end thereof for working the soil with a claw for cooperation with the prongs for gripping weeds to facilitate the removal thereof from the ground.

A further object of my invention is the provision of novel means for mounting the prongs and claw on the handle, whereby one is movable relative to the other so that the weeds can be effectively gripped.

A further important object of my invention is to provide a combined weed remover and soil pulverizer embodying earth-working prongs rockably mounted on one face of the handle, with a claw rigidly mounted on the other face of the handle, so that when pressure is applied to the handle, the teeth of the claw can be moved between the prongs for firmly clamping weeds between the teeth and prongs, spring means being provided for automatically separating the claw and prongs when pressure is released from the handle to permit the dropping of the pulled weeds.

A still further object of my invention is to provide a combined garden tool of the above character which will be durable and efficient in use, one that will be simple and easy to manufacture, and one which can be placed upon the market at a reasonable cost.

With these and other objects in view, the invention consists in the novel construction, arrangement, and formation of parts, as will be hereinafter more specifically described, claimed, and illustrated in the accompanying drawing, in which drawing:

Figure 1 is a fragmentary side elevation of the forward end of my improved tool, with parts thereof broken away and in section to illustrate structural details.

Figure 2 is a fragmentary side elevation of the forward end of the tool showing the prongs and claw in their weed-gripping position.

Figure 3 is a side elevation of my complete tool, showing the same on a small scale.

Figure 4 is a front elevation of the prongs and claw, showing the same in their weed-gripping position with a weed held between the same, the view being on a larger scale than Figure 3 and on a smaller scale than Figures 1 and 2.

Figure 5 is a top plan view of the earth-working prongs removed from the handle, the lower clamping plate being shown engaging the shanks of the prongs, the view being taken on the same scale as Figure 4.

Referring to the drawing in detail, wherein similar reference characters designate corresponding parts throughout the several views, the letter T generally indicates my improved garden tool, which includes an elongated handle 10 that can be formed from wood or other light material.

Carried by the extreme forward end of the handle is my novel means for working the soil around plants and for removing weeds therefrom. This means includes an elongated plate 11, which extends forwardly from the front end of the handle 10, and this plate is firmly secured at its rear end to the handle by means of bolts 12 and 13. The bolts 12 and 13 also serve another function, as will be later set forth, but it is to be noted that the bolt 13 is considerably longer than the bolt 12. Nuts 14 and 15 are counter-sunk in the handle, and the bolts are threaded in these nuts. The extreme forward end of the elongated plate 11 is bent downwardly at an angle and is bifurcated to provide teeth 16, which form the claw for the weeds, as will be later described.

Disposed on the opposite face of the handle 10 from the plate 11 is a supporting plate 17 having its rear end provided with spaced openings 18 and 19 for receiving the bolts 12 and 13. The openings have a greater diameter than the diameter of the bolts, so that the attaching and supporting plates 17 can rock on the bolt 18. An expansion spring 20 is coiled about the bolt 13 and is confined between the plate 17 and an adjusting nut 21. The spring acts to hold the plate 17 tight against the handle 10.

The forward end of the plate 17 supports the prongs 22, which can be of any desired number. The shanks 23 of the prongs extend at an angle to the prongs and have their rear ends bent into converging relation, as clearly shown in Figure 5. Any preferred means can be provided for clamping the prongs to the plate 17, and, as shown, I provide a clamping plate 24. The clamping plate is held securely against the shanks of the prongs by means of rivets or the like 25.

In use of my improved garden tool, the same is grasped by the hands of the operator and the prongs 22 are utilized for working the soil around plants and the like. When a weed is encountered, downward pressure is exerted on the handle to rock on the plate 17, bringing the teeth 16 of the claw between the prongs 22, which will wedge the weed between the teeth of the claw and the prongs. A pull can now be exerted on the handle, and the weed will be effectively withdrawn from the ground with its roots.

As soon as downward pressure is released from the handle, the claw and prongs will separate to automatically release the weed.

From the foregoing description it can be seen that I have provided an exceptionally simple and durable garden tool for effectively working the soil and removing weeds without cutting the roots so that the roots will be pulled with the weeds.

Changes in detail may be made without departing from the spirit or the scope of my invention, but what I claim as new is:

1. A garden tool comprising an elongated operating handle, a forwardly extending plate rigidly secured to one face of the handle, a depending claw formed on the plate, ground-working prongs rockably mounted on another face of the handle, the prongs and the teeth of the claw both extending in the same direction, with the teeth of the claw arranged between the prongs, the claw and prongs being movable toward one another when downward pressure is exerted on the handle.

2. A garden tool comprising an elongated operating handle, an elongated plate having its rear end fitted on one side of the handle, a supporting plate fitted against the other side of the handle, both of said plates projecting forwardly from the handle, a pair of bolts rigidly clamping the elongated plate to the handle, the attaching plate being rockably mounted on one of said bolts, an expansion coil spring arranged on the other bolt against said attaching plate for normally holding the attaching plate against the handle, a depending claw formed on the forward end of the elongated plate, and a series of depending prongs carried by the attaching plate, the teeth of the claw being disposed between the prongs.

JOHN G. RIEFF.